US005608624A

United States Patent [19]

Luciw

[11] Patent Number: 5,608,624

[45] **Date of Patent: *Mar. 4, 1997**

[54] METHOD AND APPARATUS FOR PROCESSING NATURAL LANGUAGE

[75] Inventor: William W. Luciw, Morgan Hill, Calif.

[73] Assignee: Apple Computer Inc., Cupertino, Calif.

[ * ] Notice: The term of this patent shall not extend beyond the expiration date of Pat. No. 5,434,777.

[21] Appl. No.: 441,076

[22] Filed: May 15, 1995

Related U.S. Application Data

[63] Continuation of Ser. No. 215,064, Mar. 18, 1994, Pat. No. 5,434,777, which is a continuation-in-part of Ser. No. 889,225, May 27, 1992, Pat. No. 5,390,287, and a continuation-in-part of Ser. No. 99,861, Jul. 30, 1993, Pat. No. 5,477,447.

[51] Int. Cl.[6] .............................. G06F 15/38; G06G 7/60

[52] U.S. Cl. .............................. 395/794; 395/10; 395/12; 395/51; 395/54; 395/60; 395/62; 395/759

[58] Field of Search ......................... 364/419.01, 419.08, 364/419.1, 419.11, 419.12, 419.13; 395/10, 12, 50, 51, 54, 60, 62, 63, 75, 76, 77, 600

[56] References Cited

U.S. PATENT DOCUMENTS

| | | | |
|---|---|---|---|
| 4,670,848 | 6/1987 | Schramm | 364/513 |
| 4,713,775 | 12/1987 | Scott et al. | 364/513 |
| 4,736,296 | 4/1988 | Katayama et al. | 364/419 |
| 4,750,122 | 6/1988 | Kaji et al. | 364/419 |
| 4,785,413 | 11/1988 | Atsumi | 364/900 |
| 4,875,187 | 10/1989 | Smith | 364/900 |
| 4,887,212 | 12/1989 | Zamora et al. | 364/419 |
| 4,918,723 | 4/1990 | Iggulden et al. | 379/100 |
| 4,945,504 | 7/1990 | Nakama et al. | 364/709 |
| 4,953,106 | 8/1990 | Gansner et al. | 364/521 |
| 4,974,191 | 11/1990 | Amirghodsi | 364/900 |
| 4,994,966 | 2/1991 | Hutchins | 364/419 |
| 5,091,790 | 2/1992 | Silverberg | 358/434 |
| 5,103,498 | 4/1992 | Lanier et al. | 395/68 |

(List continued on next page.)

FOREIGN PATENT DOCUMENTS

| | | | |
|---|---|---|---|
| 0441089A2 | 8/1991 | European Pat. Off. | 3/23 |
| PTO932164 | of 1989 | Japan . | |

OTHER PUBLICATIONS

Ahmed et al.; "Intelligent Natural Language Query Processor"; TENCON '89. Fourth IEEE Region 10 International Conference 22–24; Nov. 1989; pp. 47–49.

(List continued on next page.)

*Primary Examiner*—Gail O. Hayes
*Assistant Examiner*—Stephen R. Tkacs
*Attorney, Agent, or Firm*—Hickman, Beyer & Weaver

[57] ABSTRACT

A method and apparatus for processing natural language and deducing meaning from a natural language input characterized by the steps of (a) receiving an ordered string of word objects having a natural language meaning, (b) selecting a word window length, and (c) successively moving the word window along the ordered string and analyzing the meaning of a substring of word objects that fall within the word window. The substring is removed from the ordered string if the substring has a recognized meaning, until all substrings of the ordered string that fit within the window have been analyzed. In a step (d), the word window length is reduced and step (c) is repeated until only an unrecognized residual of the ordered string remains. The meaning of the substring is analyzed by mapping the substring against a database using one or more mapping routines. The mapping routines are preferably arranged in a hierarchy, wherein a successive mapping routine is used to analyze the substring when a previous mapping routine in the hierarchy cannot map the substring. A computer-implemented task is determined from the recognized substrings and performed by the computer system. The apparatus of the present invention implements the method on a pen-based computer system, and the ordered string is preferably received from strokes entered by a stylus on a display screen of the pen-based computer or from a microphone receiving speech input.

28 Claims, 12 Drawing Sheets

U.S. PATENT DOCUMENTS

| | | | |
|---|---|---|---|
| 5,109,509 | 4/1992 | Kayatama et al. | 395/600 |
| 5,123,103 | 6/1992 | Ohtaki et al. | 395/600 |
| 5,175,814 | 12/1992 | Anick et al. | 395/161 |
| 5,237,502 | 8/1993 | White et al. | 364/419.01 |
| 5,278,980 | 1/1994 | Pedersen et al. | 395/600 |
| 5,282,265 | 1/1994 | Suda et al. | 395/12 |
| 5,327,342 | 7/1994 | Roy | 364/419 |
| 5,357,431 | 10/1994 | Nakada et al. | 364/419.13 |
| 5,369,575 | 11/1994 | Lamberti et al. | 364/419.08 |
| 5,369,577 | 11/1994 | Kadashevich et al. | 364/419.13 |
| 5,390,281 | 2/1995 | Luciw et al. | 395/12 |
| 5,434,777 | 7/1995 | Luciw | 364/419.13 |
| 5,442,780 | 8/1995 | Takanashi et al. | 395/600 |
| 5,477,447 | 12/1995 | Luciw et al. | 364/419.08 |
| 5,477,451 | 12/1995 | Brown et al. | 364/419.08 |

OTHER PUBLICATIONS

Beck et al.; "Integrating Natural Language, Query Processing, and Semantic Data Models"; COMCON Spring '90. IEEE Computer Society International Conference, 1990; 26 Feb.–2 Mar. 1990; pp. 538–543.

O'Connor, Rory J., "Apple Banking on Newton's Brain", San Jose Mercury News, Apr. 22, 1991.

Hendrix, Gary G. and Walter, Brett A., "The Intelligent Assistant: Technical Considerations Involved in Designing Q&A's Natural–Language Interface," Byte Magazine, Dec. 1987, Issue 14, p. 25.

Edwards, John R., "Q&A: Integrated Software with Macros and an Intelligent Assistant," Byte Magazine, Jan. 1986, V. 11, Issue 1, pp. 120–122.

Goldberg, Cheryl, "IBM Drawing Assistant: Graphics for the EGA", PC Magazine, Dec. 24, 1985, vol. 4, Issue 26, p. 255.

Garretson, R., "IBM Adds 'Drawing Assistant' Design Tool to Graphic Series," PC Week, Aug. 13, 1985, V. 2, Issue 32, p. 8.

Glinert–Stevens, Susan, "Microsoft Publisher: Desktop Wizardry," PC Sources, Feb. 1992, V. 3, Issue 2, p. 357.

Nilsson, B. A., "Microsoft Publisher is an Honorable Start for DTP Beginners," Computer Shopper, Feb. 1992, V. 12, Issue 2, p. 416.

Poor, Alfred, "Microsoft Publisher," PC Magazine, Nov. 26, 1991, V. 10, Issue 20, p. 40.

Rampe, Dan et al., Jan. 9, 1989 news release, Claris Corp. (announced "SmartForm Designer" and SmartForm Assistant).

Berry, Deanne et al., Apr. 10, 1990 news release, Symantec, (announced new version of MORE™).

Elofson, G. et al., "Delegation Technologies: Environmental Scanning with Intelligent Agents," Jour. of Management Info. Systems, Summer 1991, V. 8, issue 1, pp. 37–62.

Nadoli, Gajanana et al., "Intelligent Agents in the Simulation of Manufacturing Systems," Proceedings of the SCS Multiconference on AI and Simulation, 1989.

Sharif Heger et al., "KNOWBOT: An Adaptive Data Base Interface," Nuclear Science and Engineering, Feb. 1991, V. 107, No. 2, pp. 142–157.

Ohsawa, I. et al., "A computational Model of an Intelligent Agent Who Talks with a Person," Research Reports on Information Sciences, Series C, Apr. 1989, No. 92, pp. 1–18.

Ratcliffe, Mitch et al., "Intelligent Agents Take U.S. Bows," MacWeek, Mar. 2, 1992, V. 6, No. 9, p.1.

Boy, Guy A., Intelligent Assistant Systems, Harcourt Brace Jovanovicy, 1991.

"Microsoft Windows User's Guide for the Windows Graphical Environment," version 3.0, Microsoft Press, copyright 1985–1990, pp. 33–41 & 70–74.

R. Wilensky et al., "Talking to UNIX in English: an Overview of UC," Communications of the ACM, Jun. 1984, vol. 27, No. 6.

Tello, Ernest R., "Natural–Language Systems," Mastering AI Tools and Techniques, Howard W. Sams & Company, 1988.

Knight, Kevin, & Rich, Elaine, "Heuristic Search," Production Systems, Artificial Intelligence, 2nd ed., McGraw–Hill, Inc., 1983–1991.

Miastkowski, Stan, "paperWorks Makes Paper Intelligent," Byte Magazine, Jun. 1992.

Dickinson et al., "Palmtips: Tiny Containers for All Your Data," PC Magazine, Mar. 1990, vol. 9, p. 218(3).

Bajarin, Tim, "With Low End Launched, Apple Turns to Portable Future", PC Week, Oct. 1990, vol. 7, p. 153(1).

Corporate Ladder, BLOC Pulishing Corp., 1991.

Diagrammaker, Action Software, 1989.

Diagram–Master, Ashton–Tate, 1989.

Microsoft MS–DOS Operating System User's Guide, Microsoft Corporation, 1982, pp. 4–1 to 4–16, 5–1 to 5–19.

72 ↘

| SUBSTRING | LOCATION |
|---|---|
| Lunch with Bill Monday 12:30 pm at Chez Sovan | LENGTH=9, POS=1 |
| Lunch with Bill Monday 12:30 pm at Chez | LENGTH=8, POS=1 |
| with Bill Monday 12:30 pm at Chez Sovan | LENGTH=8, POS=2 |
| Lunch with Bill Monday 12:30 pm at | LENGTH=7, POS=1 |
| with Bill Monday 12:30 pm at Chez | LENGTH=7, POS=2 |
| Bill Monday 12:30 pm at Chez Sovan | LENGTH=7, POS=3 |
| Lunch with Bill Monday 12:30 pm | LENGTH=6, POS=1 |
| with Bill Monday 12:30 pm at | LENGTH=6, POS=2 |
| Bill Monday 12:30 pm at Chez | LENGTH=6, POS=3 |
| Monday 12:30 pm at Chez Sovan | LENGTH=6, POS=4 |
| ⋮ | ⋮ |
| Lunch with Bill | LENGTH=3, POS=1 |
| with Bill Monday | LENGTH=3, POS=2 |
| Bill Monday 12:30 | LENGTH=3, POS=3 |
| [Monday 12:30 pm] | LENGTH=3, POS=4 |
| at Chez Sovan | LENGTH=3, POS=4 |
| [Lunch with] | LENGTH=2, POS=1 |
| Bill | LENGTH=2, POS=1 |
| at | LENGTH=2, POS=1 |
| at Chez | LENGTH=2, POS=2 |
| [Chez Sovan] | LENGTH=2, POS=3 |
| [Bill] | LENGTH=1, POS=1 |
| at | LENGTH=1, POS=1 |

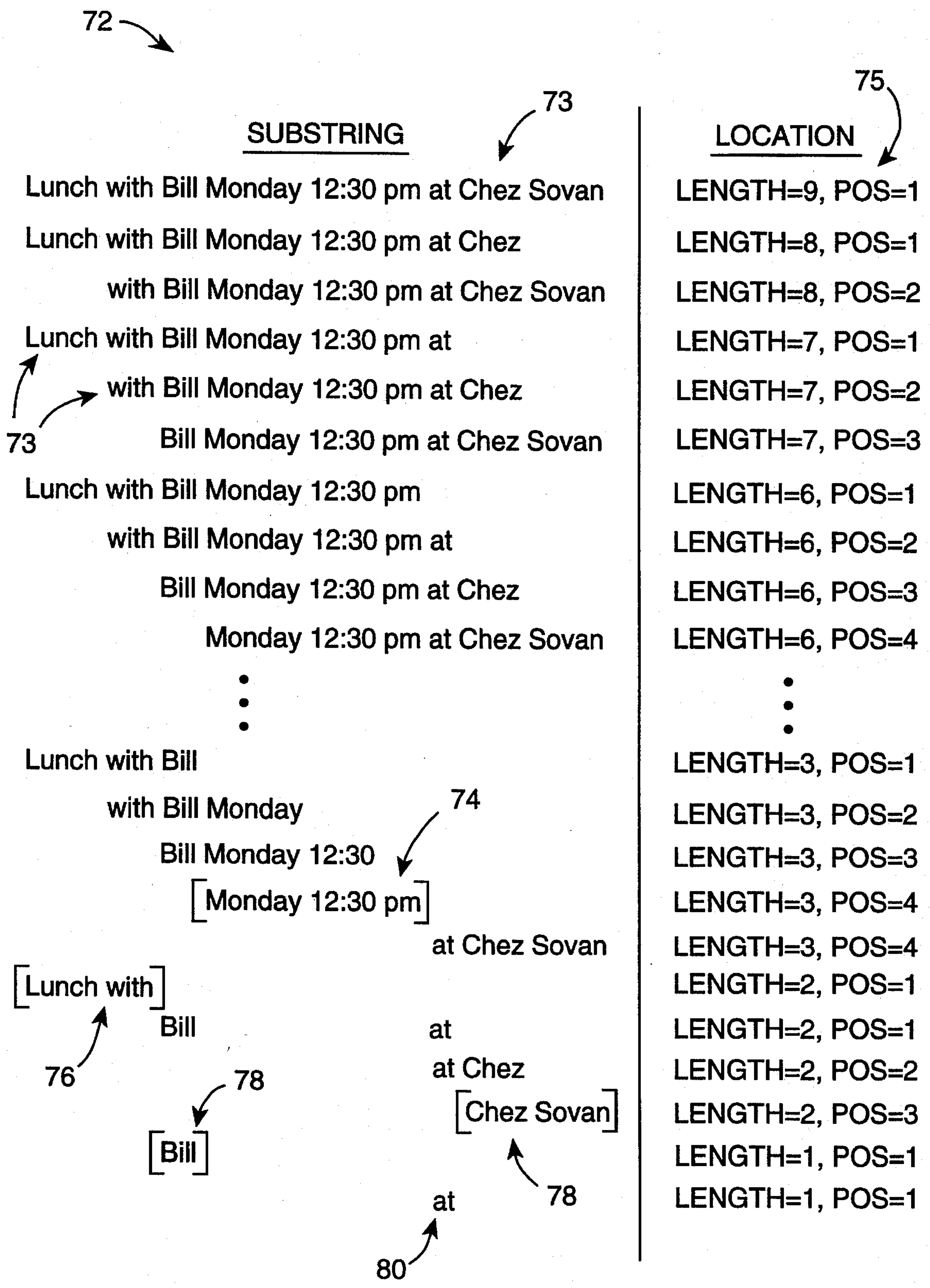

| LEVEL (128) | MAPPING ROUTINE (130) | COMPUTATIONAL COST (132) |
|---|---|---|
| 1 | PHRASAL PROCESSOR | LOW |
| 2 | PATTERN PROCESSING | MEDIUM |
| 3 | DATABASE PROCESSING | HIGH |

147↘

148↘ HITARRAY ↙150  152↙

| POSITION | LENGTH | VALUE |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| 7 | 1 | 0 |
| 8 | 1 | 0 |
| 9 | 1 | 0 |
| 1 | 2 | 0 |
| 2 | 2 | 0 |
| 3 | 2 | 0 |
| 4 | 2 | 0 |
| 5 | 2 | 0 |
| 6 | 2 | 0 |
| 7 | 2 | 0 |
| 8 | 2 | 0 |
| 1 | 3 | 0 |
| 2 | 3 | 0 |
| 3 | 3 | 0 |
| 4 | 3 | 0 |
| 5 | 3 | 0 |
| 6 | 3 | 0 |
| 7 | 3 | 0 |
| ⋮ | ⋮ | ⋮ |
| 1 | 6 | 0 |
| 2 | 6 | 0 |
| 3 | 6 | 0 |
| 4 | 6 | 0 |
| 1 | 7 | 0 |
| 2 | 7 | 0 |
| 3 | 7 | 0 |
| 1 | 8 | 0 |
| 2 | 8 | 0 |
| 1 | 9 | 0 |

*Figure 7a*

PHRASE LOOK-UP TABLE — 172

| PHRASES | INSTANCES |
|---|---|
| "APPLE" | <COMPANY-1><br>< FOOD-1> |
| "ICELAND" | <COUNTRY-1> |
| "ISAAC" | <PERSON-1><br><PERSON-2><br><PERSON-3> |
| "ITALY" | <COUNTRY-2> |
| "LUNCH WITH"<br>"SCHEDULE<br>   LUNCH WITH" | <MEET-1><br><MEET-2> |
| "ZORRO" | <HERO-1> |

174 → PHRASES column
176 → INSTANCES column
180 → arrow to 178

<MEET-1>

"LUNCH WITH"

— 178

PATTERN LOOK-UP TABLE ← 184

| PATTERN | INSTANCE |
|---|---|
| . | . |
| . | . |
| . | . |
| <num>  "pm" | <Timeslot> |
| <num> ":" <num> | <Timeslot> |
| . | . |
| . | . |
| . | . |

← 186

<TIMESLOT>

<TIMESLOT-1>

"12:30 pm"
12:30:00

TIME = 1015
LOCATION (12,7-12)

208

| | 210 | 212 | 214 | | |
|---|---|---|---|---|---|
| 1 | Scheduling | Meet | Person | Place | Day/Time |
| 2 | Finding | Find | Quantifier | Object | |
| 3 | Filing | File | Quantifier | Notes | |

⋮

| | | | | | | |
|---|---|---|---|---|---|---|
| 6 | Formatting | Format | Notes | Form | | |
| 7 | Mailing | Mail | Person | Place | Letter | |
| 8 | Faxing | Fax | Person | Place | Fax # | Notes |
| 9 | Print | Print | Object | Place | | |
| 10 | Calling | Call | Person | Place | Phone | |

METHOD AND APPARATUS FOR PROCESSING NATURAL LANGUAGE

CROSS REFERENCE TO RELATED APPLICATIONS

This is a continuation of U.S. patent application Ser. No. 08/215,064 filed on Mar. 18, 1994 now U.S. Pat. No. 5,434,777, which is a continuation-in-part of U.S. parent patent application Ser. Nos. 07/889,225, filed May 27, 1992 on behalf of Luciw et al., entitled, "Method and Apparatus for Deducing User Intent and Providing Computer Implemented Services," now U.S. Pat. No. 5,390,281, and 08/099, 861, filed Jul. 30, 1993 on behalf of Luciw et al., entitled, "Method and Apparatus for Providing Computer-Implemented Assistance," now U.S. Pat. No. 5,477,447, which are hereby incorporated by reference herein.

BACKGROUND OF THE INVENTION

The present invention relates generally to computer systems, and more particularly to methods for processing natural language input from users of computer systems.

Computerized personal organizers are becoming increasingly popular. They perform such functions as keeping a calendar, an address book, a to-do list, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information.

Computer systems, including pen-based computer systems, can also incorporate speech recognition. Although still mostly in the developmental stage, speech recognition has many potential uses in computer systems. For example, in a portable pen-based computer, speech input and recognition can be used to conveniently record dictated messages or other spoken documents and to present the dictated words as an electronic text document for editing, printing, faxing, etc. or to input commands into the computer system.

Stylus, speech, keyboard, and other forms of input can take the form of "natural language," i.e. an "utterance." Natural language is written or spoken input that is in a natural form that a person would use as if speaking or writing to another person. Non-natural language would be language, such as computer commands or programs, which is constrained by a limited syntax, structure, and/or scope.

Natural language input permits a user to easily interface with a computer system using well-known language. One area in computer systems which is particularly well-adapted for natural language input is computerized assistance. Computers systems that use computerized assistance deduce or hypothesize a user's intent and automatically provide a service based on the deduced intent. For example, a tasks such as printing a document or scheduling an appointment can be implemented by a computer system by deducing information from a user's inputs or preferences. Natural language input allows a user to quickly specify a service or task to be implemented using a complex form and thus is well suited for use with computerized assistance.

The recognition of natural language by computer systems has been difficult due to the complex and shifting "rules" of human natural language. A user may input a natural language phrase, such as, "meeting with Bill on Tuesday at lunch" to instruct the computer system to schedule the meeting in a calendar application program. The computer system typically recognizes the individual words to recognize the meaning of the entire phrase. However, by recognizing small portions of the input phrase separately, a complete, overall meaning for the phrase is often incorrect, inaccurate, or incomplete.

Natural language input has been typically processed using one of several methods. A natural phrase or string can be matched to a known phrase in a phrase lexicon used by the computer. A long command is typically processed by matching individual words or smaller phrases to items in the lexicon. Another method used to process natural language is to examine parts of the input phrase for a standard pattern. For example, a number including a colon and followed by "am" or "pm" fits the pattern of a phrase indicating time. A different method used to process natural language is to query a database that stores a large number of phrases and match a phrase to one or more items stored in the database.

The abovementioned processes have typically been used with a fixed set of rules to interpret natural language. An a priori specification of known linguistic structures and their meaning is used to perform semantic interpretation. Each of the abovementioned processes has limitations in versatility and the time required to match a phrase. Natural language processing of the prior art has thus been inefficient and rigid in its ability to recognize the meaning of natural language utterances.

What is needed is a natural language processor that will quickly and accurately identify and map natural language input phrases. What is further needed is a natural language processor that identifies phrases according to a dynamic set of rules and data.

SUMMARY OF THE INVENTION

The present invention provides a natural language processor for the user of a computer system. The method of the present invention analyzes portions or substrings of a natural language input string to determine the meaning of the input string. Large substrings are analyzed and reduced in size until the substrings can be mapped into a database using mapping routines. Three dynamic mapping routines are preferably used in sequence in the present invention: a phrasal processor, a pattern processor, and a database query processor. These processors provide a robust method of identifying the meaning of natural language input.

More particularly, a method for deducing meaning from a natural language input comprises the steps of (a) receiving an ordered string of word objects having length and a natural language meaning, (b) selecting a word window length that is no greater than the length of the ordered string, and (c) successively moving the word window along the ordered string and analyzing the meaning of a substring of word objects that fall within the word window. The substring is removed from the ordered suing if the substring has a recognized meaning, until all substrings of the ordered string that fit within the window have been analyzed. In a step (d), the word window length is reduced and step (c) is repeated until only an unrecognized residual of the ordered string remains. The ordered string is preferably received from strokes entered by a stylus on a display screen of a pen-based computer or from a microphone receiving audible speech input. The step of analyzing the meaning of the substring preferably includes mapping the substring against a database using one or more mapping routines. The mapping routines are preferably arranged in a hierarchy, wherein a successive mapping routine is used to analyze the substring when a previous mapping routine in the hierarchy cannot map the substring. The method preferably further includes a step of determining a computer-implemented task specified by the ordered string using the recognized substrings and performing the computer-implemented task.

A method for recognizing meanings of natural language phrases comprises the steps of attempting to map at least a portion of an ordered string of word objects into a database according to a phrasal mapping routine. If the string portion does not map into the database using the phrasal mapping routine, a step of attempting to map the portion into a database according to a pattern mapping routine is accomplished. If the pattern mapping routine is unable to map the string portion, then a database query mapping routine attempts to map the string portion. The mapping routines are preferably dynamic mapping routines referencing dynamic data structures. Remaining portions of the ordered string are preferably mapped according to the mapping routines until all word objects of the string have been analyzed.

A preferred apparatus in accordance with the present invention implements the natural language processor on a computer system, and more preferably on a small, handheld computer system such as a personal digital assistant (PDA). The natural language can be input into the PDA by a variety of methods including a tablet-and-stylus, an input microphone, a keypad, etc.

Because the natural language processor first analyzes larger substrings of an input string and then reduces the size of the substrings, natural language input is more quickly and reliably processed and its meaning determined. In addition, the present invention uses three dynamic natural language processors in succession to allow greatly increased sensitivity to the context of natural language input and enhanced capability in interpreting the input.

These and other advantages of the present invention will become apparent to those skilled in the art upon a reading of the following specification of the invention and a study of the several figures of the drawing.

BRIEF DESCRIPTION OF THE DRAWINGS

FIG. 3 is a table illustrating the method of examining substrings of the present invention;

Figure 4:
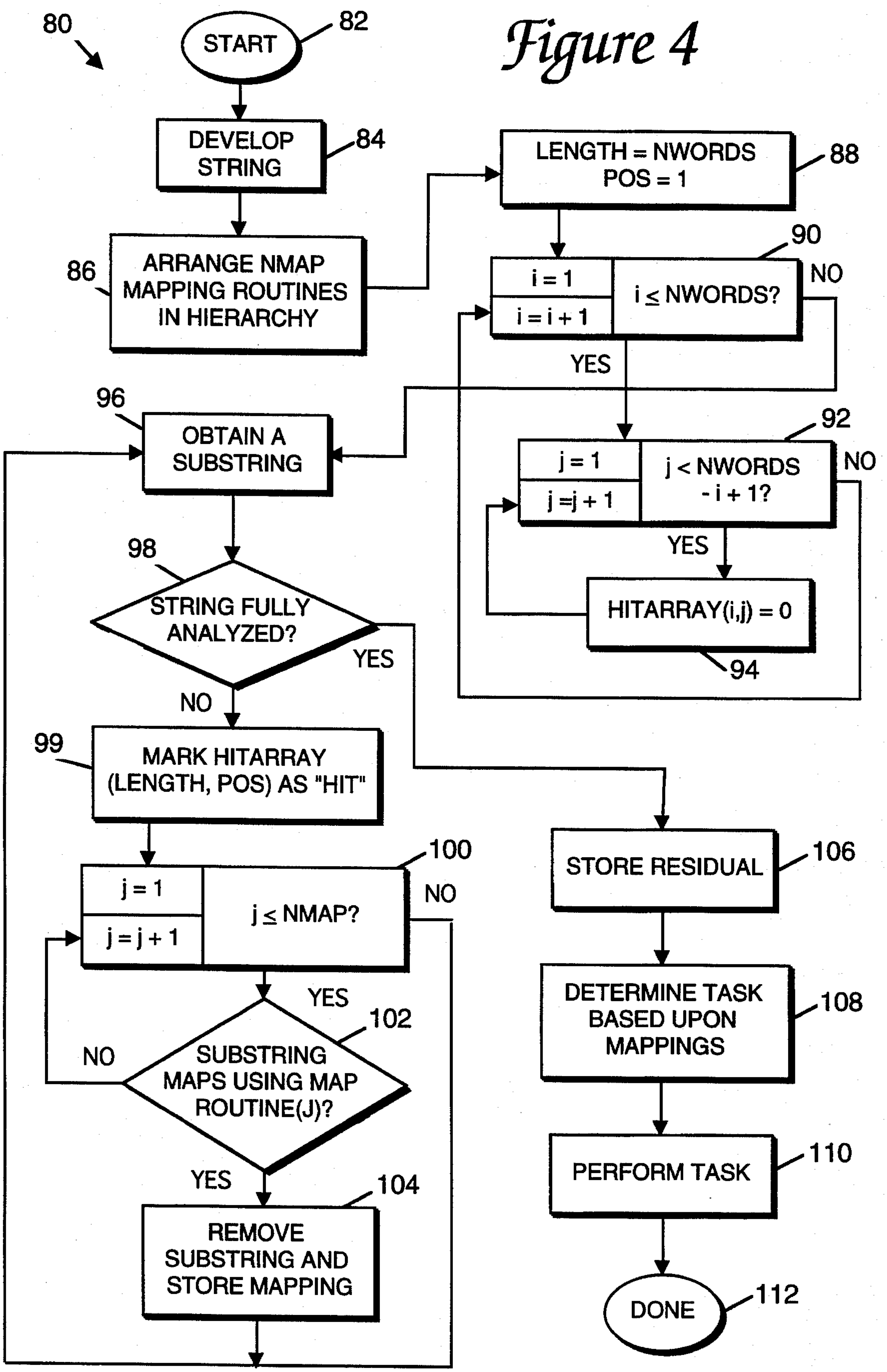
FIG. 4 is a flow diagram illustrating the method of processing natural language of the present invention.
Figure 8:
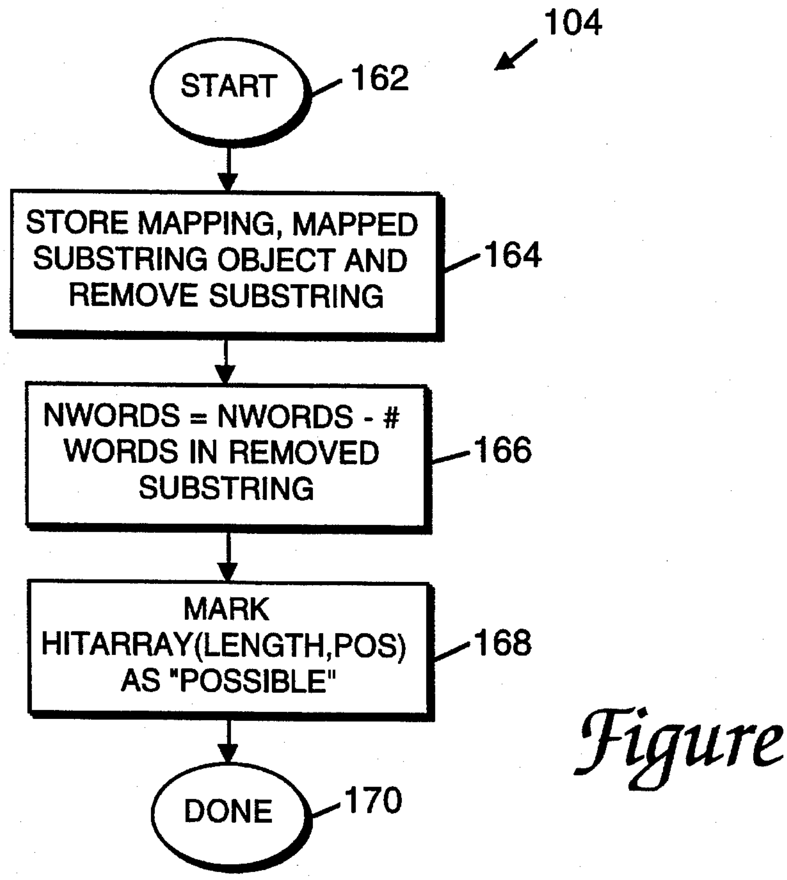
Figure 13:
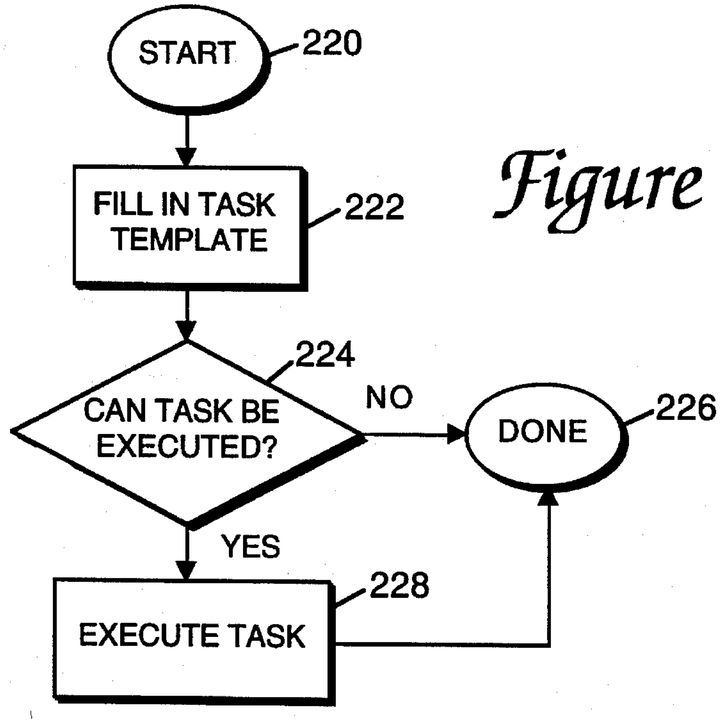
Figure 9:
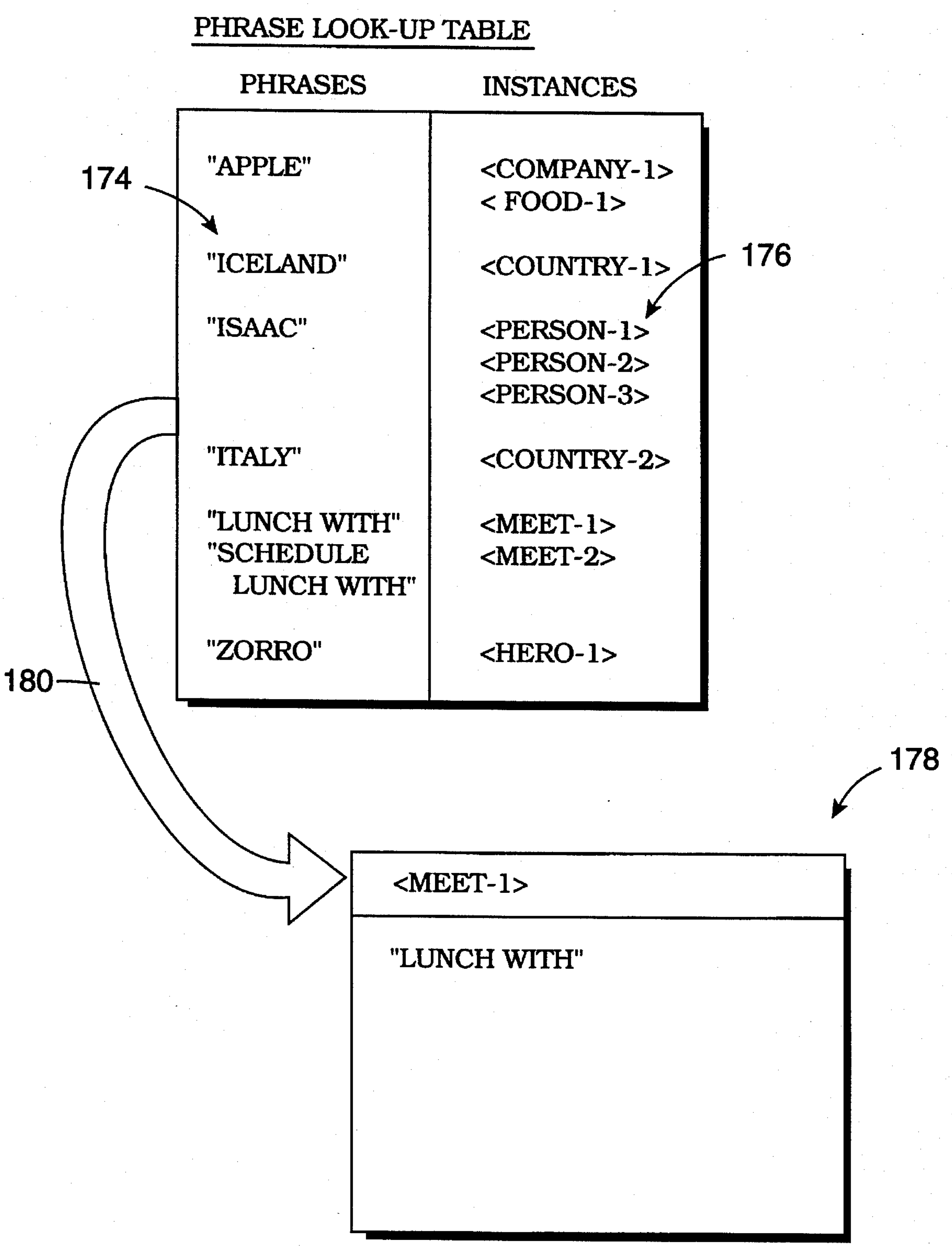
Figure 10:
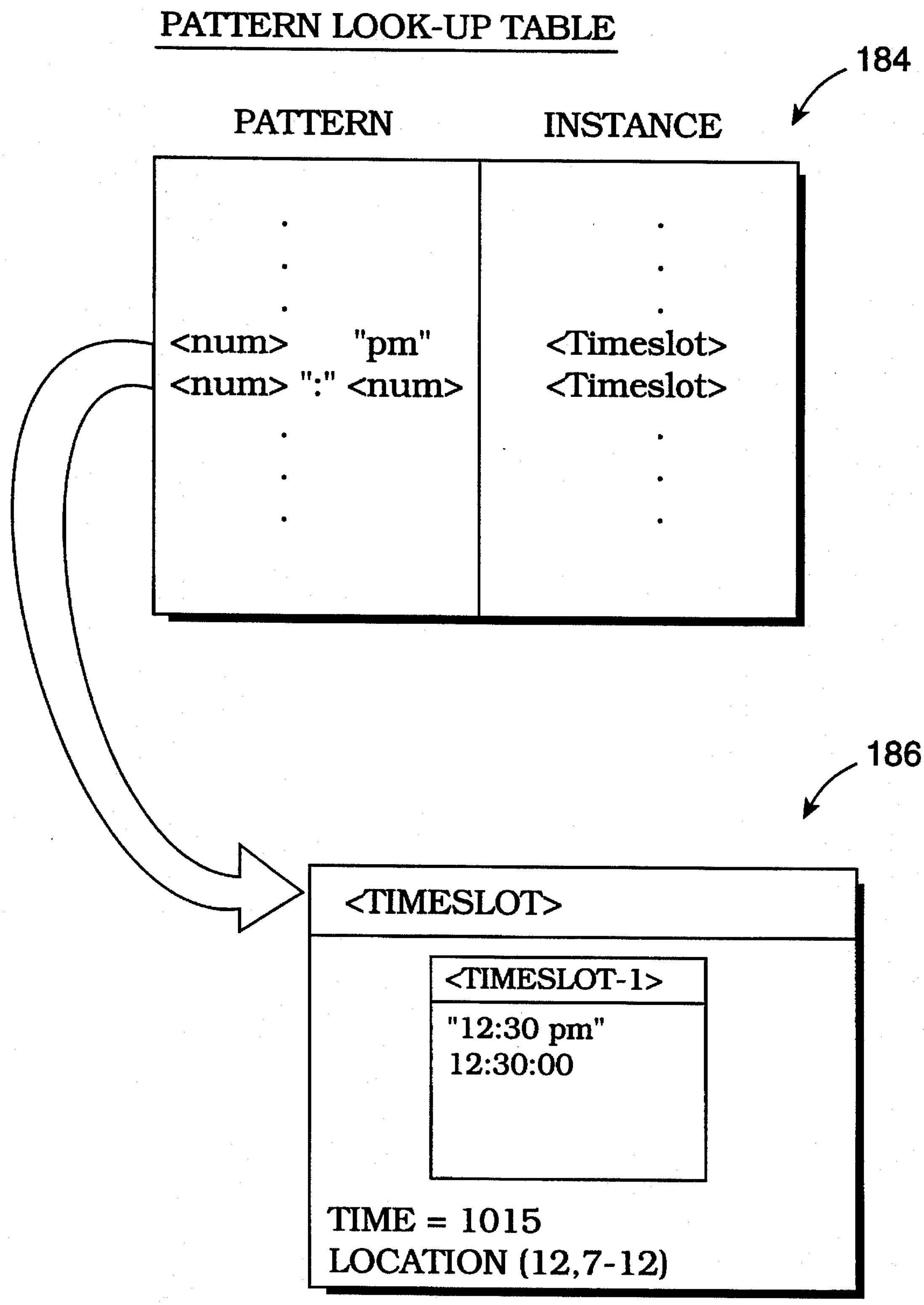
Figure 11:
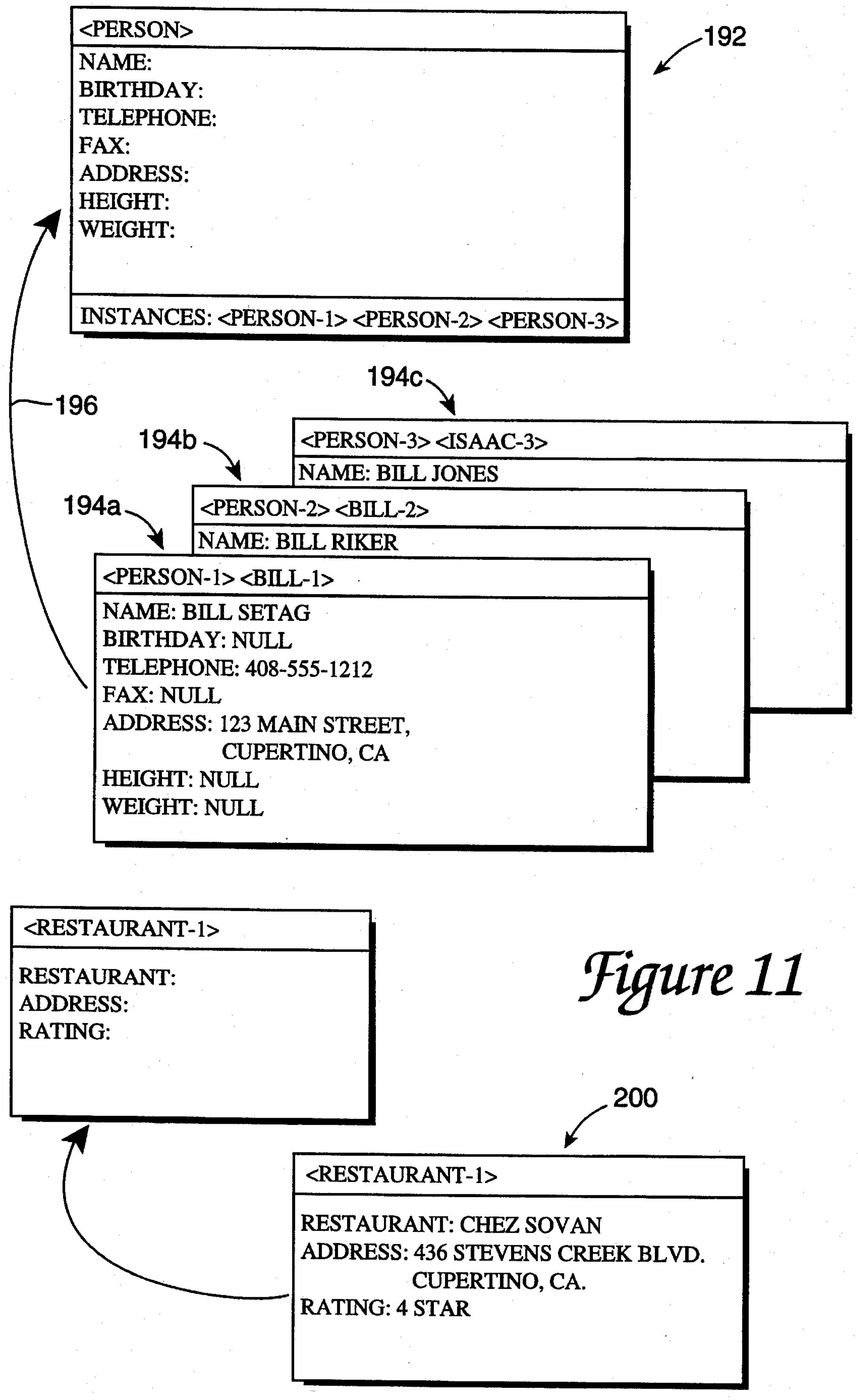
Figure 12:
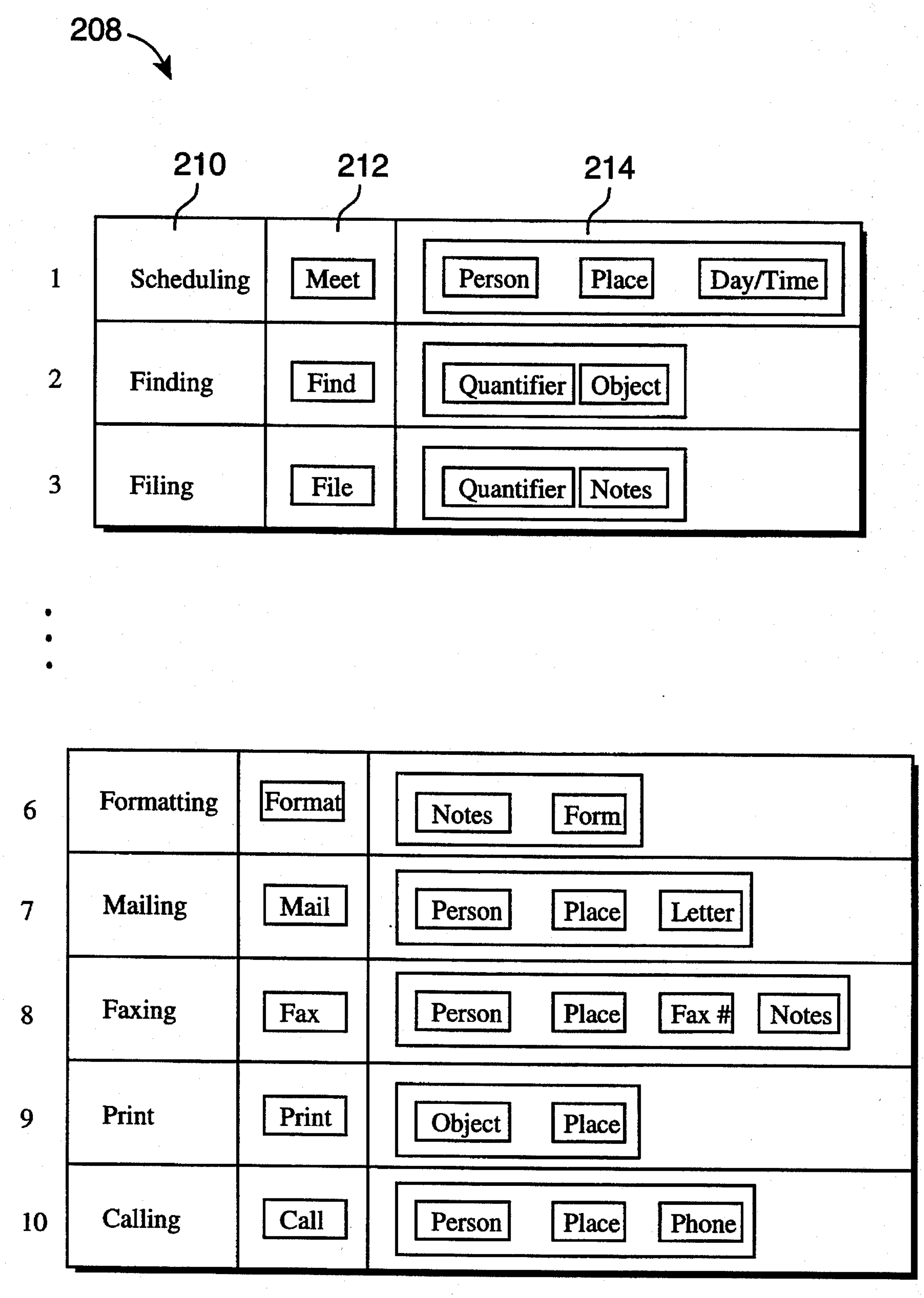

FIG. *7a* is a table showing the contents of the matrix HITARRAY;

FIG. 8 is a flow diagram illustrating the step of removing a substring and storing a mapping of FIG. 4;

FIG. 9 is a phrase look-up table used for the phrasal processor of the present invention;

FIG. 10 is a pattern look-up table used for the pattern processor of the present invention;

FIG. 11 is a type frame illustrating a database query processor of the present invention;

FIG. 12 is a task template used for determining a task in the present invention; and FIG. 13 is a flow diagram illustrating the determine task and perform task steps of FIG. 4.

DETAILED DESCRIPTION OF THE PREFERRED EMBODIMENT

The present invention is well suited for pointer-based computer systems such as the pen-based, pen-aware and mouse controlled systems that are currently popular. The present invention is also well suited for computer systems implementing voice input and speech recognition. For the purposes of illustration, the invention will be described in connection with a pen-based system incorporating voice input. However, the present invention is also suitable for other types of computer systems, such as mainframe systems, keyboard based systems, etc.

Figure 1:
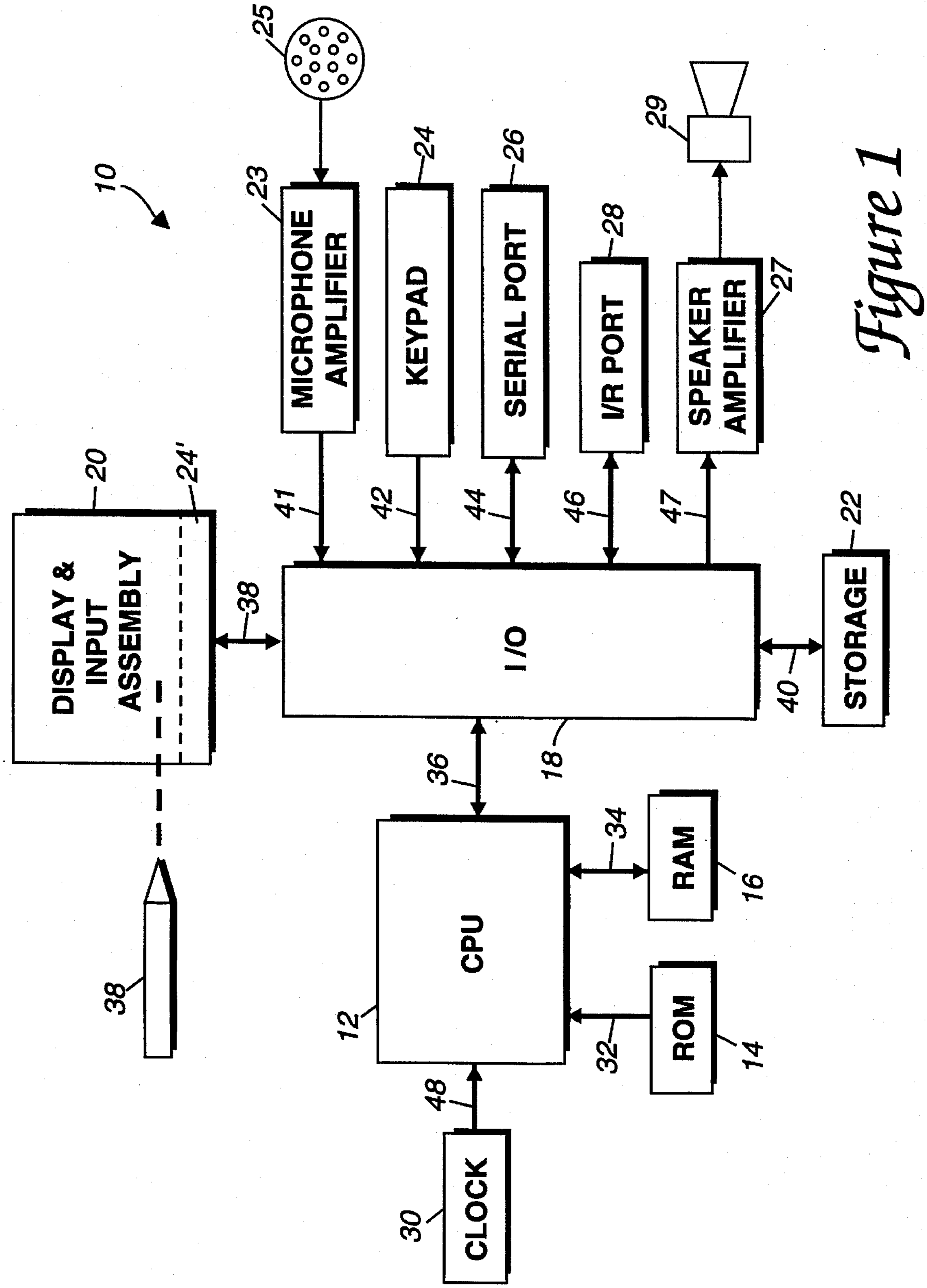
FIG. 1 is a block diagram of a pen-based computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a microphone amplifier 23, a microphone 25, a keypad (or keyboard) 24, a serial port 26, an infrared (I/R) port 28, a speaker amplifier 27, a speaker 29, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, amplifier 23, keypad 24, serial port 26, I/R port 28, and amplifier 27.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Microphone amplifier 23 is coupled to I/O circuitry by bus 41 and includes well-known components which convert a speech signal input in microphone 25 to an analog signal, such as amplifiers, preamplifiers, etc. Amplifier block 23 can also include components which convert the analog signal to digital signals that can be used with CPU 12, such as analog to digital converters (ADC's). The recognition of words spoken by a user can be implemented in software executed by CPU 12, and is well known to those skilled in the art.

Figure 2:
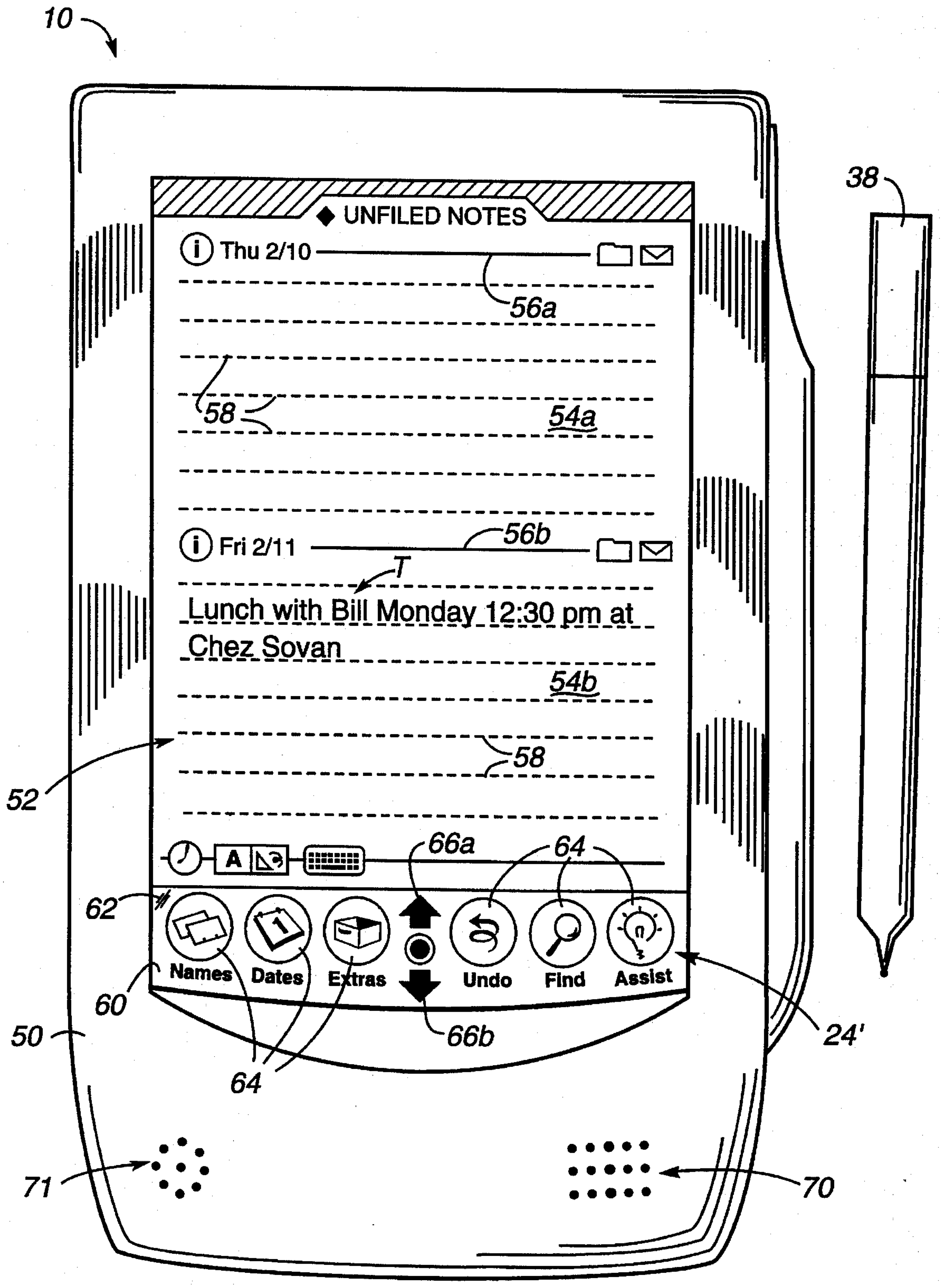
FIG. 2 is a top plan view of the pen-based computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The FR port can be used for outgoing information (e.g. to control a printer or some other external device, or to communicate with other computer systems) or for incoming information from other computers or devices.

Speaker amplifier 27 is coupled to I/O circuitry by a bus 47. Amplifier 27 is used to drive a speaker 29 with signals output by CPU 12 and can also include components such as filters, specialized sound chips, etc. Speaker 29 can be used for audio output such as sound effects, synthesized voice, and other user feedback.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x and y) coordinates of a pixel of the screen of display assembly 20 over which the tip of the stylus is positioned. Commercially available combination display assemblies such as the aforementioned assemblies available from Scriptel Corporation, Sharp, and others include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area **54*a* including a header bar 56*a* and a number of guidelines 58. The header bar 56*a* preferably includes the date of creation of the note area 54*a* and a number of icons and "soft" buttons, not particularly germane to the discussion of the present invention. For this reason, the header bar 56*a* will not be discussed in detail herein. The optional guidelines 58 aid a user in entering text, graphics, and data into the pen-based computer system 10**.

Additional note areas, such as a note area **54*b*, can be formed by the user by drawing a substantially horizontal line across the screen 52 with the stylus 38. The substantially horizontal line is recognized by the system 10 and is converted into a second header bar 56***b*. Additional text, graphical, and other data can then be entered into this second note area 54*b*. For example, the text object T is a phrase that has been entered into second note area 54*b*. In the described embodiment, text object T was originally entered as several strokes of "ink" which were recognized by the CPU and converted into printed words of the object T. Text object T can also be entered by speaking words into microphone 23 which are recognized and displayed.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a ,keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66*a* and 66*b*. The operation of the note areas 54*a*, 54*b*, etc., scroll buttons 66*a* and 66*b*, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from speaker 29 which is housed within enclosure 50. The speaker can be used to provide user feedback, or to transmit audible information to a user. Enclosure 50 is also preferably provided with apertures 71 which permit the reception of sound from an external source to microphone 25. A user can preferably speak into apertures 71 to provide voice input to the microphone speaker 23. Alternatively, apertures 70 and speaker 29 can be used as a dual function speaker/microphone.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56*a* and 56*b* include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III,* by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

A method for processing natural language of the present invention is a process that is continuously running on the system 10, i.e. the method monitors input and events continuously. The method can be considered to be an extension of the operating system which continuously notices user behavior.

The method of the present invention is well suited for use with computerized assistance. For example, a method for deducing user intent and providing computer implemented services is disclosed in co-pending U.S. parent patent application Ser. Nos. 08/099,861 and 07/889,225, which were previously incorporated by reference.

FIG. 3 is a table 72 illustrating the method used in the present invention for mapping substrings (portions) of an ordered string into a database to recognize the substrings, and determine a computer-implemented task specified by the ordered string. The column on the left lists several substrings 73, which are a number of consecutive word objects of an ordered input string that has been delineated from user input. In the example of FIG. 3, text object T as shown in FIG. 2 is used as the ordered input string, which includes the word objects "Lunch with Bill Monday 12:30 pm at Chez Sovan." Each entry in the left column shows a different substring being displayed by a "word window", which herein is a window having a specific word object length which can be moved along the ordered string to "display" (select) different word objects of the ordered string which fall within the boundaries of the window. The meaning of the substring displayed by the word window is analyzed, i.e. the substring is examined and attempted to be mapped against a database using a mapping routine. The fight column of table 72 lists the length and position of the word window for each substring listed in the left column of the table. LENGTH specifies the length of the word window, and therefore of the displayed substring, in amount of recognized word objects. POS specifies the position of the left edge of the word window in relation to the entire input string, where position number 1 is designated to be the first word, or the left end, of the ordered string. For example, the third substring listed in table 72 shows a word window having a length of 8, meaning the word window is displaying a substring including 8 word objects. The position POS is 2, meaning that the left edge of the word window is located at word object number 2 of the ordered input string.

The successive substrings listed in table 72 show the method and order of analyzing the ordered string according to the present invention in order to map substrings against a database and determine a task specified by the input string. In the described embodiment, the length of the word window is initially set to the largest length of the ordered string so that the largest possible substring (shown at the top of table 72) is attempted to be mapped first. In other embodiments, the intial word window length can be set smaller than the full length of the ordered string by a predetermined number of word objects.

The process then attempts to map the substring displayed by the word window into a database using mapping routines, i.e. the process attempts to recognize the meaning of the substring displayed by the word window so that the ordered string can be implemented as a task. Each substring is examined by a successive mapping routine in a predetermined hierarchy available to the computer system, where a successive mapping routine in the hierarchy is used if the substring does not map using the previous mapping routine. This process is described with reference to FIG. 4.

The displayed (currently selected) substring either maps or does not map into the available mapping database(s). If the substring can be mapped, the substring is removed from the ordered string. The word window is then moved along the ordered string to display the next substring to the right of the mapped substring. The new substring is then analyzed and attempted to be mapped into a database. If the displayed substring cannot be mapped, the word window is moved one word object to the right and the next substring is analyzed. In the described embodiment, the word window moves from left to right; however, the word window can also be moved in other directions, such as right to left. In other embodiments, the word window can be moved more than one word object along the ordered string if a substring cannot be mapped.

Once the word window is moved to the right end of the ordered string, all the substrings having the length of the word window have been analyzed. The word window is then reduced in length and is positioned at the left end of the ordered string. The word window is then moved along the ordered string in a similar fashion to that described above. The length of the word window is thus successively reduced until the length of the word window is zero. At that time, all of the word objects of the ordered string have been analyzed and are either mapped into a database or cannot be mapped using the available mapping routines.

In the example of FIG. 3, the first substring analyzed in table 72 is displayed in a word window having a length of 9 word objects (which is the total length of the input string) and a position of 1. This displayed substring fails to map into the available databases. Since the word window is already at the right end of the ordered string, the word window cannot be moved along the string any further. The length of the word window (and the substring) is thus reduced to 8 and the position of the word window is set to position 1 as shown in the second row of the left column. The substring at position 1 is analyzed, and the word window is moved, to position 2. The displayed substring at position 2 also fails to be mapped. The word window's length is reduced to 7 and it is positioned at position 1 at the fourth row of table 72, and the process continues in a similar fashion.

Eventually the size of the substring becomes small enough so that a substring can usually be mapped using a mapping routine. Substring 74, "Monday 12:30 pm", for example, has been mapped into a database using a pattern matching mapping routine when the word window has a length of 3 and a position of 4. The brackets surrounding substring 74 in FIG. 3 indicate that the substring has been mapped. Substring 74 is stored and is removed from the input string, and the process continues with the remaining word objects of the input string. Substring 76, "Lunch with" has been mapped using the phrasal matching mapping routine. Substrings 78 have been mapped using a database query mapping routine. The final word remaining is substring 80, "at", which cannot be mapped using any of the mapping routines and thus is a "residual" word from the process. The computer system then determines and implements a task according to the recognized (mapped) substrings, as detailed below with reference to FIG. 4.

A method or process 80 for processing natural language in accordance with the present invention is shown in FIG. 4. The process begins at step 82 wherein a user is interfacing with the computer system. In a step 84, an input string of recognized words is developed by the CPU 12 from natural language input received from the user. The process of developing an input string is described in more detail with reference to FIG. 5.

In next step 84, the CPU arranges NMAP mapping routines in a hierarchy. As described above, the mapping routines are methods of mapping the ordered input string to specific objects in a database that are components of a task that is to be implemented by the computer system. Step 86 is described in greater detail with reference to FIG. 5. The process then continues to step 88, wherein a variable LENGTH is set equal to NWORDS, and a variable POS is set equal to 1. Variable LENGTH stores the length, in word objects, of the word window, which is also the length of the substring being analyzed, and variable NWORDS is equal to the total number of word objects in the ordered string. Variable POS stores a number that represents the word position of the word window, which is the position that the examined substring begins, i.e. the offset from the beginning of the input string. In next step 90–94, an array of values called HITARRAY is initialized to 0. In step 90, a counter i is set to zero and the CPU checks if i is less than or equal to NWORDS. If it is, then step 92 is implemented, in which counter variable j is set to 1 and the CPU checks if j is less than NWORDS–i+1. If it is, then step 94 is implemented, in which HITARRAY(i,j) is set to 0. The nested loops continue until i is greater than NWORDS in step 90, at which point HITARRAY is completely initialized and the process continues to step 96. HITARRAY is described in further detail below with reference to FIG. 7*a*.

In step 96, the CPU obtains a substring from the input string. This is accomplished by moving the word window over a number of word objects in the input string and is described in more detail with reference to FIG. 7. After a substring has been obtained, step 98 in implemented, in which the CPU checks if the input string has been fully analyzed, i.e. if all word objects of the input string have been mapped or are not able to be mapped by the CPU. This is preferably accomplished by examining the variable LENGTH; if LENGTH=0 or null, then all of the word objects of the input string have been analyzed. If the input string has not been fully analyzed, then step 99 in implemented, in which the CPU marks a "hit" in HITARRAY; in the described embodiment, this is accomplished by setting the value at HITARRAY (LENGTH,POS) to 1. Step 100 is then implemented, in which a counter variable j is set to 1 and checked if it is less than the variable NMAP, which is the number of mapping routines being used by the computer system. While j is less than or equal to NMAP, step 102 is implemented, in which the CPU checks if the substring maps into a database using mapping routine(j). If the substring does not map using mapping routine(j), the process loops back to step 100, in which j is incremented and checked if it is less than or equal to NMAP, and step 102 is again implemented for the next mapping routine in the hierarchy. The obtained substring is thus analyzed using all available mapping routines in the order of the mapping routine hierarchy until it is either mapped into a mapping routine or not mapped into any of the mapping routines. In the described embodiment, the mapping routines with less computational cost are arranged first in the hierachy for more efficiency. Thus, if a substring can be mapped using a less complex and time consuming mapping routine, the other more complex mapping routines do not have to be implemented for that substring.

There are several well-known mapping routines known to those skilled in the art. As described below with respect to FIG. 6, three mapping routines are described herein: a phrasal processor, a pattern processor, and a database query processor. These mapping routines match (map) a substring against one or more objects (entries) in a "knowledge base". As used herein, the term "knowledge base" refers to a collection of specialized databases storing objects of a particular category which can be matched to substrings. For example, using a phrasal processor, the CPU accesses the knowledge base by looking for a match with the substring in a phrasal lexicon or look-up table, which is typically stored in memory or on a storage device such as a hard disk drive. A phrasal look-up table is described in more detail with reference to FIG. 9. Using a pattern processor, the CPU accesses the knowledge base by looking for a pattern stored within a hierarchy on the knowledge base which corresponds to a pattern within the substring. This process is described in more detail with reference to FIG. 10. For a database query processor, the CPU sends the substring as a query to a database and matches related entries in the database to the substring. This process is described in more detail with reference to FIG. 11. The knowledge base includes the hierarchical information used to assign categories to a phrases so that a task can be assigned to an input string, as described with reference to FIG. 12.

If the substring maps into a database using mapping routine(j) at step 102, step 104 is implemented, in which the substring is removed from the mapping process and the mapping is stored for later use. This step is described in more detail with reference to FIG. 8. The process then loops back to step 96, in which the word window is moved and a different substring is obtained from the input string.

Figure 7:
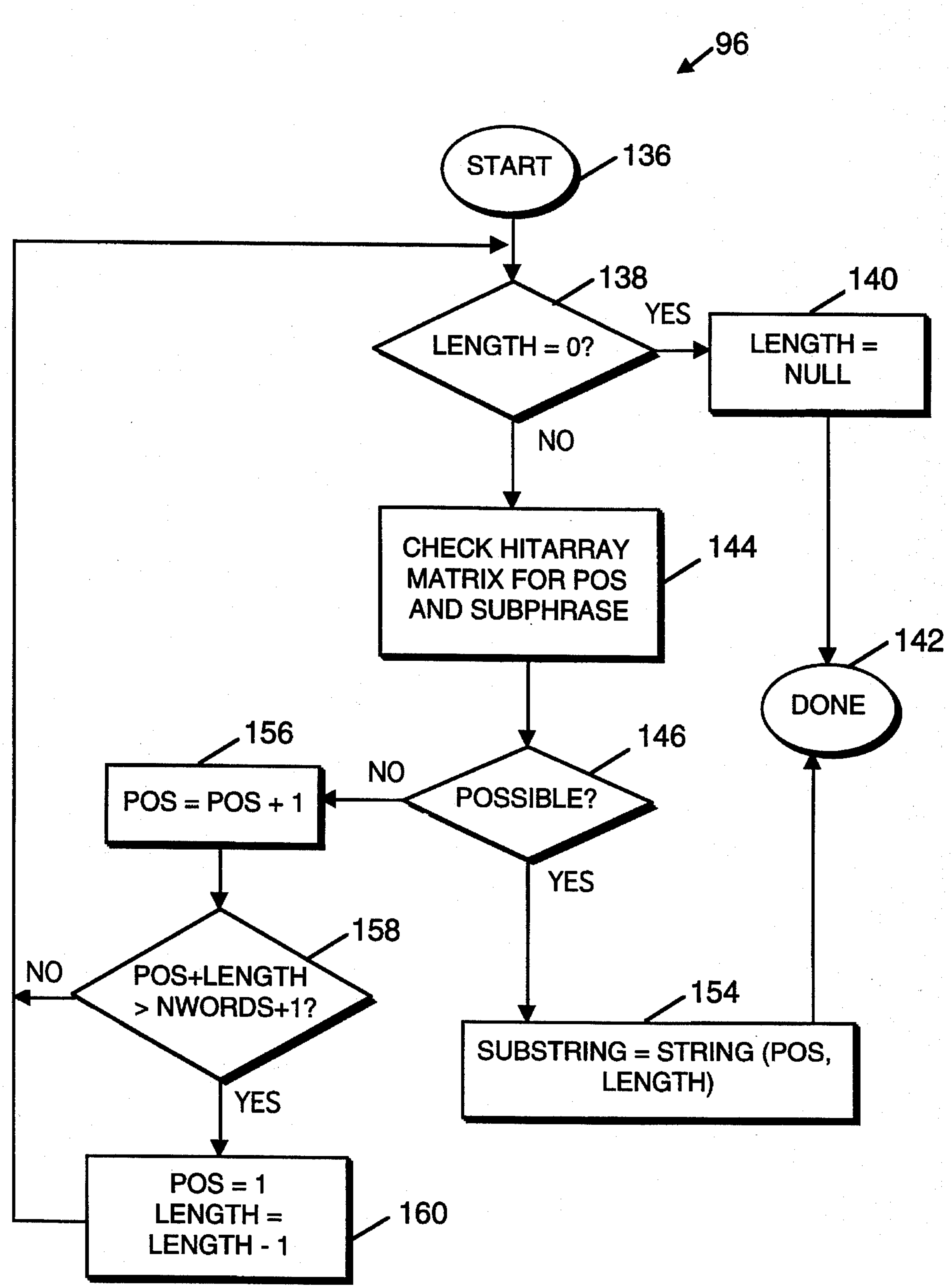
FIG. 7 is a flow diagram illustrating the step of obtaining a substring of FIG. 4.

If no mapping for the substring is found using any of the mapping routines in the hierarchy, the process loops back to step 96 to obtain a new substring which is either smaller than the substring which could not be mapped or is a different portion of the input string (detailed with respect to FIG. 7).

The process loops until all of the word objects of the input string are fully analyzed, after which the process flows from step 98 to step 106. In step 106, the "residual" from the input string is stored. The residual is the remaining words of the input string which could not be mapped from any of the mapping routines being used. Residuals are often connecting words such as "in" or "at" which have no inherent meaning for performing a task, as shown in the example of FIG. 3. In step 108, the CPU determines the task which is based upon the mappings performed earlier in the process. This step is described in more detail with reference to FIGS. 12 and 13. Once the task has been determined by the CPU, then step 110 is implemented, in which the recognized task is performed by the CPU. The process is then complete as indicated in step 112.

Although the present invention is described in terms of performing a computer-implemented task such as faxing, printing, etc. (see FIG. 12), other processes are also suitable for use with the method described herein. For example, the method of the present invention can be used to determine the meaning of an inputted phrase and output an interpretation of the inputted phrase using different terminology. Thus, a specific phrase could be "paraphrased" in simpler (or more complex) language, e.g. for educational purposes.

Figures 5, 6:
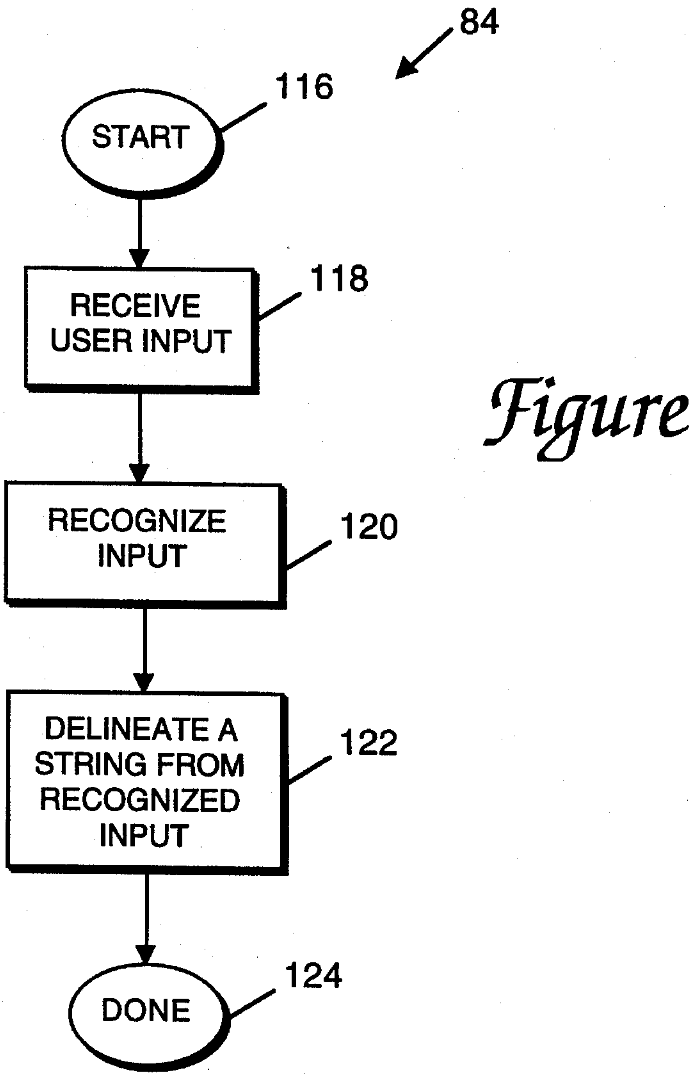
FIG. 5 is a flow diagram illustrating the step of developing a string of FIG. 4.
FIG. 6 is a table illustrating a hierarchy of mapping routines used in the present invention.

FIG. 5 is a flow diagram illustrating step 84 of FIG. 4, in which a string is developed from user input in the form of natural language. The process begins at step 116, and, in step 118, the CPU receives user input, preferably as natural language in spoken or written form. Natural language is characterized by phrases which the user enters in a natural form, i.e., in a form which is not constrained by rules which the computer must follow to process input. For example, a natural language phrase meaning "I want to schedule a lunch meeting with Bill on Monday at 12:30 pm at Chez Sovan Restaurant" can be entered in several forms. One way could be "Lunch with Bill Monday 12:30 pm at Chez Sovan," as shown above. A different form could be "Have lunch 12:30 pm Monday at Chez Sovan with Bill."

One form of input suitable for the present invention is pen or stylus input, in which the user "inks" input on a screen such as display 20 with a stylus. Another form of user input is voice input, in which the user, for example, speaks into microphone 25 and the speech is converted into digital signals to be analyzed by the CPU. A different form of user input is keyboard input, wherein a user types in data or selects keys or buttons to input data. Other forms of input are also suitable for the present invention. A user can select a portion of text that is already being displayed by the computer system; the selected or highlighted text can be considered the input which the user wishes to be processed by the method of the present invention. User input can also be received from other input devices, such as storage devices, pointing devices, and communication devices (i.e. modems and the like).

In step 120, the user input is recognized. That is, each word object of the user input is recognized as a word in English or whatever selected language is being used. Herein, a "word object" is an object in the user input which is recognized, such as words or numbers. Thus, if pen strokes are entered as user input is step 118, the strokes are recognized in step 120 and divided into separate word objects, which can be made up of individual characters or letters. If the user input is voice input, the speech is recognized and similarly converted into word objects. Word objects in written natural language inputted by the user are preferably delimited by spaces or null characters, and word objects in spoken natural language are preferably delimited by pauses of a predetermined length of time. Software used for recognition of various types of user input is well known to those skilled in the art. The method of the present invention preferably closely cooperates with the recognition architecture of the operating system. The recognition architecture preferably recognizes higher-level meanings from strokes made by the stylus 38 on the screen 42 of display assembly 20 and from voice input spoken into microphone 25. While the method of the present invention is not limited to any one recognition architecture, the pen stroke recognition of the present invention is particularly well adapted to operate with the recognition architecture described in co-pending U.S. patent application Ser. Nos. 07/889,216, filed May 27, 1992 on behalf of Beernink et al., entitled "Recognition Architecture and Interface", and U.S. patent application Ser. No. 08/001,123, filed Jan. 5, 1993 on behalf of G. Pagallo, entitled, "Method and Apparatus for Computerized Recognition," both assigned in common with the present application to Apple Computer, Inc., the disclosures of which are hereby incorporated by reference in their entirety. The speech recognition of the present invention can be used with speech recognition products sold on the market, such as PlainTalk by Apple Computer, Inc.

Step 122 is next implemented, in which a input string (i.e. phrase) is delineated from the recognized user input. The length of the string is determined by the amount of input data; the CPU preferably marks the end of an input string by checking for a timeout or a spaceout. A timeout occurs when a predetermined length of time has expired after the last word is input into the computer system; if no additional words are input within that length of time, the CPU assumes that the user is finished entering input and delineates a string from the input. A spaceout occurs when the user writes with a stylus or other pointing device on an area of display screen 20 that is a predetermined distance from the previously-written words and letters of the input data. If a spaceout occurs, the CPU similarly assumes that the user has finished entering data and delineates a string from the inputted data. The delineated string is preferably made up of ordered word objects which are delimited by a space or null located between each word object. With a string delineated from the user input, the process is complete as indicated in step 124.

FIG. 6 is a chart 126 illustrating step 86 of FIG. 3, in which NMAP mapping routines are arranged in a hierarchy. In FIG. 6, the hierarchy level 128 is shown as the left column, the specific mapping routine 130 is shown in the middle column, and the computational cost 132 is shown in the right column. In the described embodiment, a phrasal processor is designated the first mapping routine in the hierarchy, followed by a pattern processor as the second mapping routine and database query processor as the third mapping routine. Other types of mapping routines can also be used; for example, more specialized mapping routines can be used for applications of specific subjects. Also, mapping routines can be added to or removed from the hierarchy. In the preferred embodiment, the mapping routine of level 1 is the mapping routine having the lowest computational cost. This means that the level 1 mapping routine examines and processes the input string in the least amount of time and using the least amount of computational cycles. Conversely, the last level mapping routine (level 3 in the described embodiment) preferably is the most complex mapping routine which has the highest computational cost and takes the most amount of computational cycles to process substrings of the input string. The higher level mapping routines are used only when the lower level routines are unable to map a substring.

FIG. 7 is a flow diagram illustrating step 96 of FIG. 3, in which the CPU obtains a substring from the input string. The process begins at a step 136, and, in a step, 138, the CPU checks if the variable LENGTH, representing the length of the word window, is equal to zero. If so, step 140 is implemented, in which LENGTH is set equal to null, indicating that all of the word objects of the input string have been analyzed by the mapping routines. The process is then complete as indicated at step 142.

If LENGTH does not equal zero at step 138, then step 144 is implemented. In step 144, the CPU checks the HITARRAY matrix for the value stored in the array at location (LENGTH, POS). The first time through the process, LENGTH is equal to NWORDS and POS is equal to 1 from the initialization in step 88 of FIG. 4. In step 146, the CPU examines the value obtained from HITARRAY and determines if the substring is "possible" or not. Herein, a substring that is "possible" means that the substring has not yet been analyzed, i.e. it has not yet been displayed in the word window. A substring that is not possible means that the substring has already been analyzed by the mapping routines.

A table 147 showing the contents of the matrix HITARRAY is shown in FIG. 7*a*. The first column 148 shows the values that POS (position) may contain. The second column 150 shows the values that LENGTH may contain. In the example of table 147, NWORDS is initially equal to 9, the nine words of the input string shown as text object T in FIG. 2. When LENGTH =9, the length of the examined substring is 9 words, which is the entire string. There is thus only one position for the length 9 substring: position 1. If this examined substring cannot be mapped into a mapping routine, LENGTH is decremented to a lesser value, and more positions of the substring can be assigned values in the table. For example, if LENGTH =3, then there are seven different positions that a substring of length 3 can possess within the 9-word string. Each of those seven positions is listed in table 147.

For each entry in table 147, a value of HITARRAY-(LENGTH, POS) is listed in column 152. As shown in FIG. 7*a*, the VALUE column is initialized to all zeros in steps 90–94 of FIG. 4. Thus, all the positions of all possible substrings are set to "possible". Once a substring is analyzed by the mapping routines, its value in table 147 is set to "1" as shown in step 99 of FIG. 4. The maximum number of value entries for all possible lengths and positions of substrings is equal to ($NWORDS^2$+NWORDS)/2.

Referring back to FIG. 7, in step 146 the CPU checks HITARRAY for the current values of LENGTH and POS. In the preferred embodiment, LENGTH is initially set to the maximum number of words and is decremented if a mapping cannot be found for the larger substring. It has been found that more phrases are mapped accurately and a task is executed more in accordance with the user's intent if larger substrings are examined before reducing the size of the substring. Mapping a substring to a mapping routine is described in more detail below with reference to FIG. 8. If the CPU finds that the current substring is possible, then step 154 in implemented, in which the substring is set equal to the string defined by the current values of POS and LENGTH. For example, if LENGTH=9 and POS=1, then the substring is set equal to the entire input string T as shown in FIG. 2, which has 9 words. If LENGTH=5 and POS=3, then the substring is set equal to 5 consecutive words of the input string starting from the third word position; using text object T, the substring would thus be equal to "Bill Monday 12:30 pm at." Once the substring is thus obtained, the process is complete as indicated in step 142.

If the CPU determines in step 146 that the current POS and LENGTH do not have a "possible" (0) value, then step 156 is implemented. In step 156, POS is incremented. In next step 158, the CPU checks if POS+LENGTH is greater than NWORDS+1. If it is not, the process loops back to step 138 to check if LENGTH is equal to zero. If the sum of step 158 is greater than NWORDS+1, then step 160 is implemented, in which POS is set equal to 1 and LENGTH is decremented. Once POS+LENGTH is greater than NWORDS+1, then that length of substring has been examined at all possible positions of the input string. The length of the word window is then decremented to see if a smaller substring can be mapped into a mapping routine. Once step 160 has been implemented, the process then loops back to step 138.

FIG. 8 is a flow diagram illustrating a process used in step 104 of FIG. 4, in which a substring has been recognized and wherein the CPU stores a mapped substring and removes that substring from the input string. The process begins at step 162. In step 164, the CPU stores the the mapping of the substring (i.e. the object or type category in the knowledge base matched to the substring) and removes the substring from the input string. The word objects of the substring are removed from the input string so that they will not be examined in further loops of the process. In the described embodiment, the word objects are flagged so that the CPU will ignore them. In step 166, NWORDS is updated to the new total number of word objects in the input string after the mapped substring has been removed by subtracting the number of word objects in the removed substring from NWORDS. In step 168, HITARRAY(LENGTH,POS) is marked as "possible", i.e., in the described embodiment, the value of HITARRAY(LENGTH,POS) is set to zero. This step is implemented because the substring at the current POS value has been removed, and any word objects in the input string which are positioned after the removed substring are now at position POS. These word objects have not been analyzed by the mapping routines, and thus should have a "possible" (0) status in HITARRAY. Once step 168 is complete, the process is complete as indicated by step 170.

FIG. 9 illustrates a phrase look-up table 172 used to match a substring to entries in the knowledge base. Table 172 includes a left side 174 of the table showing a list of substrings (phrases) and a right side 176 of the table showing a list of frame instances, i.e. occurrences within the knowledge base, of each of those phrases. For example, it can be seen that the phrase ISAAC has the three instance frames<PERSON-1>, <PERSON-2>, and <PERSON-3>. The phrase "Lunch with" has the one instance frame <MEET-1>. Similarly, the phrase "Schedule lunch with" has the instance frame <MEET-2>. Table 172 is used as a "phrasal lexicon" of often-used phrases. The CPU can map a substring to an instance frame using look-up table 172 in a small amount of time compared to the other mapping routines described herein.

A "frame" system is a preferred data structure used herein and is a form of semantic network. As is well known to those skilled in the art, a semantic network is a knowledge representation system where unary predicates are treated like types and binary predicates are treated like attributes. Further, the types are arranged in a taxonomy where subassumption holds. For example, for every item x, predicate2(x) implies predicate1(x) if predicate2 is a specialization of predicate1, i.e. DOG(FIDO) implies MAMMAL(FIDO).

A second aspect of a semantic network is the notion that there exists a binary relation called an attribute that maps unary predicates. For example, consider the unary predicates DOG(FIDO) and COLOR(BROWN). An attribute may exist called COLOR-OF that can relate the unary predicates as follows:

COLOR-OF(DOG(FIDO),COLOR(BROWN))
or
COLOR-OF(FIDO,BROWN)

A semantic network can be represented by a directed graph where the nodes are either types or constants and the edges are either labeled with an attribute or with the special label IS-A. To find out, for example, if a particular person in the knowledge base has a certain attribute, a search is commenced at a node representing that person and traveling up the IS-A links until a node is found with an edge labeled with the attribute. Therefore, graph traversal is the main source of inference in a semantic network.

As noted above, semantic networks are well known to those skilled in the art of building knowledge bases. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

The frame system is an elaboration of a semantic network. See, Brachman and Leveseque, supra. Frame systems elaborate on the structure of types themselves and their attributes. Specifically, frame systems have three aspects:

1) Values of attributes are stored explicitly or stored as a default value that the individual slot can inherit. This effectively caches some of the graph traversal.
2) Value or role restriction are constraints that must be satisfied by attribute values. These restrictions can constrain a value to be of a certain type (known as value class), of a certain maximum or minimum cardinality (in the case of multivalued slots), or a combination of both.
3) Attached procedures (also known as daemons or angels) that are invoked when a value is accessed (either by getting or setting). This allows values to be computed on-the-fly. The procedures can be completely arbitrary or be expressed in a restricted language. In either case, the procedure returns the computed value and whatever side-effects that may have occurred.

Frames used in the present invention have a number of slots which may contain data, daemons, or other frames. Slots are accessed by making assertions to the knowledge base. For example, if it was desired to retrieve all of the frames that were colored red, a typical frame accessor language query would be in the form of:

(QUERY (MEMBER-VALUE COLOR?×RED)

and would return a list of frames that have a COLOR slot whose value is red. Compound queries can also be made.

In particular, FIG. 9 shows list 172 as a special case of a frame, referred to commonly as a "type" flame, since the flame refers to other particular types of flames, i.e., the types <PERSON>, <COUNTRY>, <MEET>, etc. Particular instances of the types are shown as instance flames.

Frame 178 is an instance flame of the type frame <MEET>. A slot in the instance frame 178 holds the phrase, "lunch with." As depicted by the arrow 180, there is a "IS-A" link between the instance frame 187 and the type frame 172 for traversal of the semantic network. When the phrase "lunch with" has been matched to the type flame <MEET>, a "semantic attribute tag" for the type frame <MEET> is stored as the mapping into the knowledge base. A semantic attribute tag is a reference which points to a type frame in the knowledge base and informs the CPU where to access a piece of information in the knowledge base and what type of information it is.

The information in the phrase look-up table is dynamic. That is, the instance flames located in a type frame, and the type frames themselves, can be changed by a user. More frames can be added by the user to cover a specific range of topics and/or different types of tasks. Since the method of the present invention uses a knowledge base to reference information, the CPU can refer to a dynamic body of data in look-up table 174 to match a substring to a specific frame object. The present invention is thus not limited to a fixed set of phrases nor a fixed database structure for accessing the phrases. The dynamic knowledge base structure allows a flexible, customized system for mapping a substring to an object or a task.

FIG. 10 illustrates the use of a pattern processor to match a substring to an object in the knowledge base. A pattern table 184 has a column of patterns on its left-hand side and a column of instance flames on its right-hand side. Two examples of patterns include "Monday 12:30 pm" and "12:30 Monday", both of which signify the time 12:30 pm. The patterns for these two substrings are as follows:

<weekday><num>":"<num>"pm"
and
<num>":"<num><weekday> as noted in table 184. Essentially, the first pattern for lunch time/date is a weekday string (i.e. "Monday", "Tuesday", Wednesday", etc.) followed by a number, followed by a colon, followed by another number, and finally followed by "pm". The second pattern is similarly constructed with the weekday at the end of the pattern and no "pm" specified. In either case, a match to the pattern look-up table would produce the instance frame <TIMESLOT>.

When a substring matches the first pattern <weekday><num>":"<num>"pm", an instance frame 186 <TIMESLOT> is made. Within frame 186 there is at least one slot, which comprises another frame 188. Frame 188 is named <TIMESLOT-1>, and thus is the first instance of frame type <TIMESLOT>. The first slot within frame 188 includes the string "Monday 12:30 pm" which matched into the pattern table. The second slot in frame 188 includes the numeric value of the string. For example, Monday can be assigned the number 2, so that the number in the second slot of frame 188 is 7:12:30:00. The pattern processor thus returns a semantic attribute tag <TIMESLOT> which is a mapping into the knowlege base for a time/date category substring. As with the phrasal processor (look-up table) in FIG. 9, the CPU can refer to a dynamic database of patterns; the user can add or remove different patterns as desired. The pattern processor thus does not have a specific, rigid set of patterns, but instead has a changing set which maximizes context sensitivity to a substring.

FIG. 11 illustrates accessing the knowledge base through a database query. Frame 192 is a type frame of the type <PERSON> which is stored in the knowledge base. The data stored in the knowledge base can be stored in a separate database. A database particularly suitable for the database query processor is known as a "soup", wherein data structures used in the soup are not predetermined or fixed. Frames thus may have differing numbers of slots, attributes, etc. Frame 192 has a number of slots for various attributes applicable to a person, such as NAME, BIRTHDAY, TELEPHONE, FAX, etc. Frame 192 also includes a list of all frames which are an instance of the type frame <PERSON>, namely <PERSON-1>, <PERSON-2>, and <PERSON-3>.

Frames 194*a*, 194*b*, and 194*c* are instance frames of the type frame <PERSON>. For example, frame 194*a* is instance <PERSON-1> of frame 192 and has the name <BILL-1>. Frame 194*a* is provided with the same slots as type frame 192, except some of the slots are filled with data. For example, the NAME slot of frame 194*a* is filled with the name "Bill Setag." Unfilled slots have a null value or can be set to a default value. Likewise, frames 194*b* and 194*c* have slots filled with data about their Bills. As depicted by the arrow 196, there is an IS-A link between the instances frames 194*a*–194*c* and the type frame 192 for traversal of the semantic network. Like the other mapping routines, the database query processor is dynamic in that a user can add or remove any number of frames to the knowledge base to modify the structure and information contained therein. The database query is a much more general mapping routine than, for example, the phrasal look-up table of FIG. 9. The database query can potentially search an entire database for a frame object that matches the substring. A database query thus has a much greater computational cost than the phrasal processor and the pattern processor, which use a limited lexicon of data. Since the examination of several database frames can take a long time, the database query processor is preferably used only if other, less costly mapping routines cannot map the substring.

When the substring "Bill" is queried to a database and found, the database query processor recognizes through the knowledge base that "Bill" is a name and therefore information for this substring will be found in the <PERSON> type frame. As is well known to those skilled in the art, a description of the knowledge base frames can be accessed to interpret the database query. For example, the query "Bill" can be found in the knowlege base description to refer to a <PERSON> type frame. Once the <PERSON> type frame is accessed, the instance frames <PERSON-I>, <PERSON-2>, and <PERSON-3> can be accessed. If information about a specific "Bill" is required, one of the "Bill" instance frames must be chosen, since there are three Bill instance frames in the database shown in the example of FIG. 11. The selection of the BILL instance frame that most likely corresponds to the user's intended person can be based on several different criteria. One method is to look at the number of instances that each BILL frame was selected by the user in the past. The BILL frame having the most number of past selections can be considered the most likely selection and can be automatically chosen by the CPU. This and other methods of choosing frames when user intent is unclear is described in copending U.S. parent patent application Ser. Nos. 08/099,861 and 07/889,225, which were previously incorporated by reference herein. The returned semantic attribute tag would refer to the <PERSON> frame for the example shown in FIG. 11.

A <RESTAURANT> type frame 200 is used to trace restaurant names queried to a database. For example, the CPU would receive the query "Chez Sovan" and can examine a <PLACE> type frame (not shown) to find the <RESTAURANT> type frame 200 in a similar process to that described above. The <RESTAURANT> type frame 200 includes the instance frames <RESTAURANT-1> and <RESTAURANT-2>. <RESTAURANT-1> has a field that matches the substring "Chez Sovan" and a semantic attribute tag referring to the <PLACE> frame is returned.

FIG. 12 shows a number of task templates 208 used for implementing a task. The CPU determines whether the frames found in the knowledge base match at least one of the task templates of frame combinations set forth in FIG. 12. A task is mapped to the mapped substrings using the collection of semantic attribute tags which identifies the location and type of substrings in the knowledge base. The substrings are categorized into objects according to their type using the returned semantic attribute tags. For example, the substring "lunch with" is considered an action object of type MEET. Likewise, "Bill" is considered to be a PERSON object, "Chez Sovan" is considered to be a PLACE object, and "Monday 12:30 pm" is considered to be a DAY/TIME object. These four objects in combination are subject to template comparison. The templates shown in FIG. 12 are effective for organizing the various object combinations which are capable of further operation as particular tasks to be accomplished. FIG. 12 illustrates selected example tasks 210, such as scheduling, finding, filing, formatting, mailing, faxing, printing, and calling, just to cite a few of the possibilities.

FIG. 12 further provides example kinds of action objects 212, such as meet, find, file, format, mail, fax, print, and call. The Figure provides examples of allowable combinations of objects 214 which correspond to the indicated tasks and actions. For example, essential objects for scheduling a meeting include three objects, such as person, place, and day/time. Finding activities require the combination of two objects, which are for example a quantifier and an object. Filing requires a quantifier and notes. Formatting require notes and form, mailing requires a person, a place, and a letter. Faxing requires a person, a place, a fax number, and notes. Printing requires an object and a place. Calling requires a person, a place, and a phone number.

A recognition of user intent calls for a matching operation between mapped object(s) such as those mapped in FIGS. 9–11 and the objects expressed in the templates of FIG. 12. In the example shown, the intent is not obscure. There is a template match with the scheduling task expressed in the template. The action object <MEET> of the substring "lunch with" is present in the template for the Scheduling task 210. The associated objects 214 of person, place, and day/time are all recognized (mapped) from the input string as well, permitting a complete match to the Scheduling task. Once a complete match is made, the CPU executes the associated task 210, which is described in greater detail with reference to FIG. 13.

Often a complete match to objects in a task template is not possible. Ambiguities may occur if only a few of the objects 214 have been recognized, or a set of recognized objects may fit into more than one task template. The CPU then would have to follow a method for resolving ambiguities in task assignment and user intent. One such method would be to pick the task most frequently selected by the user (or the most recent task selected by the user) if at least a partial match between that task and the inputted string has been made. Another such method would be to prompt the user with an ambiguity and require the user to clarify the ambiguity. Such methods are discussed in co-pending U.S. parent patent application Ser. Nos. 08/099,861 and 07/889,225.

FIG. 13 is a flow diagram illustrating steps 108 and 110 of FIG. 4, in which a task is determined based upon the mappings of the substrings and that task is performed by the CPU. The process begins in a first step 220, and, in a step 224, the task template 208 is filled as described above with reference to FIG. 12. A task is matched to the mapped substrings using the task template. In next step 224, the CPU checks if the determined task can be executed. If a task has been matched that requires specific parameters or conditions that are not available, then the task obviously cannot be executed, and the process is complete at step 226. Examples of tasks that cannot be executed are a faxing task when no fax machine is connected to the computer, a printing task when no printer is connected to the computer system, or a task which requires more objects or information than have been supplied by the user.

If the task can be executed, the process continues to step 228, wherein the task is executed by the CPU. Thus, in the example shown from FIG. 3, "Lunch with Bill Monday 12:30 pm at Chez Sovan", a scheduling task has been matched to the input string and the task is executed. The CPU then executes related software which has been designated for scheduling tasks. For example, the task can cause the CPU to automatically input the meeting information in a scheduling calendar program. Or, the task can cause the CPU to flash the lunch meeting information in a display area of the display screen 20. Once the task has been executed, the process is complete as indicated in step 226. As an alternative additional step, the CPU can ask for a confirmation from the user before implementing the determined task.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A computer-readable medium containing program instructions for deducing meaning from a natural language input, said program instructions performing steps comprising:

(a) receiving an ordered string of separate word objects of a selected language, where each of said word objects includes at least one alphanumeric character and is delimited from an adjacent word object, said ordered string having a length equal to the number of said word objects and having a natural language meaning;

(b) selecting a word window length that is initially at least two and that is no greater than said length of said ordered string;

(c) successively moving said word window along said ordered string, and removing a substring of word objects that fall within said word window from said ordered string when said substring has a recognized meaning, until all substrings of said ordered string that fit within said window have been analyzed; and (d) adjusting said word window length and repeating step (c) until only an unrecognized residual of word objects of said ordered string remains.

2. A computer-readable medium as recited in claim 1 wherein said step of receiving an ordered string of word objects includes receiving said ordered string from strokes entered by a stylus on a display screen of a pen-based computer.

3. A computer-readable medium as recited in claim 1 wherein said step of receiving an ordered string of word objects includes receiving said ordered string from a microphone receiving audible speech input.

4. A computer-readable medium as recited in claim 1 wherein said step of selecting a word window length includes setting said word window length to said length of said ordered string.

5. A computer-readable medium as recited in claim 4 wherein said adjusting said word window length step reduces said word window length by one word.

6. A computer-readable medium as recited in claim 1 wherein said ordered string includes a left end and a right end, and wherein said step of successively moving said window includes moving said window from an initial position on said left end of said string to a final position at said right end of said string.

7. A computer-readable medium as recited in claim 6 wherein said step of analyzing the meaning of a substring of word objects that fall within said word window includes mapping said substring against a database.

8. A computer-readable medium as recited in claim 7 wherein said step of mapping said substring includes using a plurality of mapping routines arranged in a hierarchy, wherein a successive mapping routine is used to analyze said substring when a previous mapping routine in said hierarchy cannot map said substring.

9. A computer-readable medium as recited in claim 1 wherein said program instructions further perform a step of determining a computer-implemented task specified by said ordered string using said recognized substrings.

10. A computer-readable medium as recited in claim 9 wherein said program instructions further perform a step of performing said computer-implemented task.

11. A computer apparatus with natural language recognition capabilities comprising:

a digital processor;

read/write memory coupled to said digital processor;

an input device coupled to said digital processor, said input device being receptive to an ordered string of separate word objects, where each of said word objects is delimited from an adjacent word object, said ordered string having a length equal to the number of said word objects and having a natural language meaning;

means for selecting a word window length that is initially at least two and that is no greater than said length of said ordered string; and means for (a) successively moving said word window along said ordered string, analyzing the meaning of a sub-string of word objects that fall within said word window, removing said substring from said ordered string if said sub-string has a recognized meaning, until all sub-strings of said ordered string that fit within said window have been analyzed, (b) adjusting said word window length and (c) repeating (a) and (b).

12. A computer apparatus with natural language recognition capabilities as recited in claim 11 wherein said input device comprises a stylus and a tablet of a pen-computer system, wherein said ordered string of word objects having a natural language meaning is entered into said computer apparatus by the engagement of said stylus with said tablet.

13. A computer apparatus with natural language recognition capabilities as recited in claim 11 wherein said input device comprises a microphone, wherein said ordered string of word objects having a natural language meaning is entered into said computer apparatus by the conversion of sound received by said microphone into words.

14. A computer apparatus with natural language capabilities as recited in claim 11 further comprising a word recognizer for recognizing the meaning of word objects entered by said input device.

15. A computer apparatus with natural language capabilities as recited in claim 11 further comprising a substring recognizer for recognizing the meaning of substrings of said ordered string.

16. A computer apparatus with natural language capabilities as recited in claim 15 wherein said substring recognizer comprises a plurality of hierarchically arranged recognizers.

17. A computer-readable medium containing program instructions for processing natural language input into a computer system by a user, the program instructions performing steps comprising:

(a) developing a string of separate recognized words from a natural language user input, where each word is delimited from an adjacent word;

(b) selecting a substring word length that is greater than one but no greater than a total number of recognized words of said string:

(c) mapping a substring of said string of said substring word length into a database using a mapping routine;

(d) decreasing said substring word length when said mapping routine does not map said substring; and (e) repeating step (c) and step d until said mapping routine is able to map said substring.

18. A computer-readable medium as recited in claim 17 wherein said step of developing a string includes developing a string from natural language inputted as strokes by a stylus on a display screen of a computer.

19. A computer-readable medium as recited in claim 17 wherein said step of developing a string includes developing a string from natural language inputted as audible speech into a microphone.

20. A computer-readable medium as recited in claim 17 further comprising the steps of:

examining a different substring including at least one different word object when said mapping routine does not map said substring; and mapping said different substring into a database using said mapping routine, wherein said steps of examining a different substring and mapping said different substring are accomplished before said step of decreasing said number of words in said substring.

21. A computer-readable medium as recited in claim 20 wherein said step of decreasing said number of words includes decreasing said number of words in said substring by one.

22. A computer-readable medium as recited in claim 20 wherein said mapping routine is a dynamic mapping routine.

23. A computer-readable medium as recited in claim 22 wherein said mapping routine includes a pattern processor utilizing a pattern look-up table.

24. A computer-readable medium as recited in claim 22 wherein said mapping routine includes a database query processor.

25. A computer-readable medium as recited in claim 20 wherein said mapping routine includes a phrasal processor utilizing a phrasal look-up table.

26. A computer-readable medium as recited in claim 17 wherein said mapping routine is a first mapping routine, and said method further comprises a step of developing a mapping of said substring into a database using a second mapping routine when said first mapping routine cannot map said substring.

27. A computer-readable medium as recited in claim 17 wherein said program instructions further perform a computer-implemented task based upon said mapping.

28. A computer-readable medium as recited in claim 27 wherein said step of performing a computer-implemented task includes mapping said mapped substring to a task template to determine how to implement said task.

* * * * *